US012767348B2

(12) United States Patent
Tang

(10) Patent No.: US 12,767,348 B2
(45) Date of Patent: Oct. 20, 2026

(54) ELECTRIC HYBRID EMERGENCY POWER UNIT

(71) Applicant: Honeywell International Inc., Charlotte, NC (US)

(72) Inventor: Benjamin Tang, San Gabriel, CA (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 433 days.

(21) Appl. No.: 18/486,798

(22) Filed: Oct. 13, 2023

(65) Prior Publication Data

US 2024/0351701 A1 Oct. 24, 2024

Related U.S. Application Data

(60) Provisional application No. 63/497,238, filed on Apr. 20, 2023.

(51) Int. Cl.
*B64D 41/00* (2006.01)
*G06F 1/26* (2006.01)

(52) U.S. Cl.
CPC ............... *B64D 41/00* (2013.01); *G06F 1/26* (2013.01)

(58) Field of Classification Search
CPC ................ B64D 2221/00; B64D 41/00; B64D 2013/0611; B64D 27/026; B64D 31/09; H02J 2105/32; H02J 3/46
See application file for complete search history.

(56) References Cited

U.S. PATENT DOCUMENTS

| | | |
|---|---|---|
| 5,201,798 A | 4/1993 | Hogan |
| 5,309,708 A | 5/1994 | Stewart, Jr. et al. |

(Continued)

FOREIGN PATENT DOCUMENTS

| | | |
|---|---|---|
| EP | 1619370 B1 | 3/2015 |
| EP | 4011780 A1 | 6/2022 |
| WO | 2022178452 A1 | 8/2022 |

OTHER PUBLICATIONS

Altoma et al, “Design and Simulation of Electrical Emergency System in Aircraft using Ram Air Turbine”, 2018 IEEE International Conference on Electrical Systems for Aircraft, Railway, Ship Propulsion and Road Vehicles and International Transportation Electrification Conference (ESARS-ITEC), Nottingham, UK, Nov. 9, 2018, pp. 1 through 7.

(Continued)

*Primary Examiner* — Darrin D Dunn
(74) *Attorney, Agent, or Firm* — Fogg & Powers LLC

(57) ABSTRACT

A hybrid emergency power unit for an aircraft comprises a controller, a generator-motor coupled to the controller, a hydraulic pump coupled to the generator-motor, a battery pack coupled to the controller, and a turbine coupled to the generator-motor. During a bleed air mode, the turbine and the generator-motor supply electricity to the controller, which is configured to rectify an output of the generator-motor for consumption by one or more electrical systems on the aircraft. During an augment mode, when bleed air provides insufficient power, the controller is configured to draw at least some power from the battery pack and convert the output of the generator-motor for consumption by the one or more electrical systems. During an emergency mode, the controller is configured to draw electricity from the battery pack and provide power to drive the generator-motor, which in turn drives the hydraulic pump and provides electrical power to aircraft systems.

19 Claims, 3 Drawing Sheets

(56) References Cited

U.S. PATENT DOCUMENTS

| | | | | |
|---|---|---|---|---|
| 5,767,601 | A * | 6/1998 | Uchiyama | H02K 21/046 310/67 R |
| 6,142,418 | A | 11/2000 | Weber et al. | |
| 6,244,036 | B1 | 6/2001 | Christie et al. | |
| 6,316,841 | B1 * | 11/2001 | Weber | F02C 7/32 62/331 |
| 6,467,725 | B1 * | 10/2002 | Coles | F01D 15/10 244/58 |
| 6,776,002 | B1 | 8/2004 | Ho | |
| 7,543,439 | B2 * | 6/2009 | Butt | F02C 7/32 60/785 |
| 8,957,539 | B1 * | 2/2015 | Ralston | F01D 15/10 290/52 |
| 9,327,600 | B1 | 5/2016 | Nehmeh | |
| 9,963,095 | B2 | 5/2018 | Huang et al. | |
| 10,689,129 | B1 | 6/2020 | Nehmeh | |
| 11,365,686 | B2 * | 6/2022 | Rougier | F01D 15/10 |
| 11,482,957 | B1 * | 10/2022 | Ives | H02P 9/10 |
| 12,091,182 | B1 * | 9/2024 | Amari | B64D 31/00 |
| 2010/0270858 | A1 | 10/2010 | Foch et al. | |
| 2012/0221157 | A1 | 8/2012 | Finney et al. | |
| 2012/0318914 | A1 * | 12/2012 | Rajashekara | B64D 41/00 244/58 |
| 2013/0320136 | A1 | 12/2013 | Zhou et al. | |
| 2014/0125121 | A1 * | 5/2014 | Edwards | B60R 16/03 307/9.1 |
| 2016/0362999 | A1 * | 12/2016 | Ho | B64D 41/00 |
| 2018/0155044 | A1 * | 6/2018 | Halsey | B64C 25/22 |
| 2022/0185496 | A1 * | 6/2022 | Baker | B64D 41/00 |
| 2024/0388084 | A1 * | 11/2024 | Hopkins | H02J 1/10 |

OTHER PUBLICATIONS

European Patent Office, "Extended European Search Report", dated Jun. 21, 2024, from EP Application No. 24169945.3, from Foreign Counterpart to U.S. Appl. No. 18/486,798, pp. 1 through 6, Published: EP.

* cited by examiner

ELECTRIC HYBRID EMERGENCY POWER UNIT

CROSS REFERENCE TO RELATED APPLICATION

This application claims the benefit of and priority to U.S. Provisional Application No. 63/497,238, filed on Apr. 20, 2023, the disclosure of which is herein incorporated by reference.

BACKGROUND

Aircraft emergency power systems provide electrical power and/or hydraulic power in case of aircraft system failures. Such system failures can include failures of electrical generators, hydraulic pumps, main engines, and auxiliary power units (APUs). One example of an emergency power system is a so-called ram air turbine (RAT). In the RAT, the turbine is typically designed for a minimum air speed (such as sea level stall speed) and is sized to provide rated hydraulic and electrical power. A complex control system is needed to keep the RAT from overspeed during higher aircraft speed because of excessive power resulting from the large turbine and high aircraft speed. The large turbine imposes additional drag penalty when the aircraft is gliding in an emergency. The net result is that a typical RAT has a relatively large turbine, incurring weight, size (deployment door) constraint, and drag penalty.

In some military aircraft, an emergency power unit (EPU) uses a toxic chemical propellant (e.g., hydrazine) to provide enough power for a pilot to safely land the aircraft after a loss of electrical power from the main systems. The toxic chemical propellant provides a significant cost and personnel risk to the military.

Accordingly, there is a need for an emergency power system with reduced size, weight, and drag during gliding, and that eliminates the need to use a toxic chemical propellant, with less bleed air from the aircraft engine.

SUMMARY

A hybrid emergency power unit for an aircraft comprises a controller, a generator-motor operatively coupled to the controller, a hydraulic pump operatively coupled to the generator-motor, a battery pack operatively coupled to the controller, and a turbine operatively coupled to the generator-motor. During a bleed air mode, the turbine and the generator-motor are configured to supply electricity to the controller, which is configured to rectify an output of the generator-motor for consumption by one or more electrical systems on the aircraft. During an augment mode, when bleed air provides insufficient power, the controller is configured to draw at least some power from the battery pack and convert the output of the generator-motor for consumption by the one or more electrical systems on the aircraft. During an emergency mode, the controller is configured to draw electricity from the battery pack and provide power to drive the generator-motor, which in turn drives the hydraulic pump and provides electrical power to aircraft systems.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Embodiments of an electric hybrid emergency power unit (HEPU) for aircraft are described herein. These HEPU embodiments differ from existing emergency power units various aspects. In one aspect, the HEPU embodiments do not use a conventional electrical generator, but rather, use an integrated generator-motor. With a battery providing power to the motor, the motor in turn drives a hydraulic pump during the short time at low aircraft speed. This enables the turbine of a HEPU to be much smaller than a turbine in a conventional emergency power unit such as a RAT. In addition, excess turbine power can be used to recharge the battery, if needed. Further, by using the present HEPU embodiments, hydrazine and hydrazine handling equipment are eliminated from aircraft.

Further details of various embodiments are described hereafter and with reference to the drawings.

Figure 1:
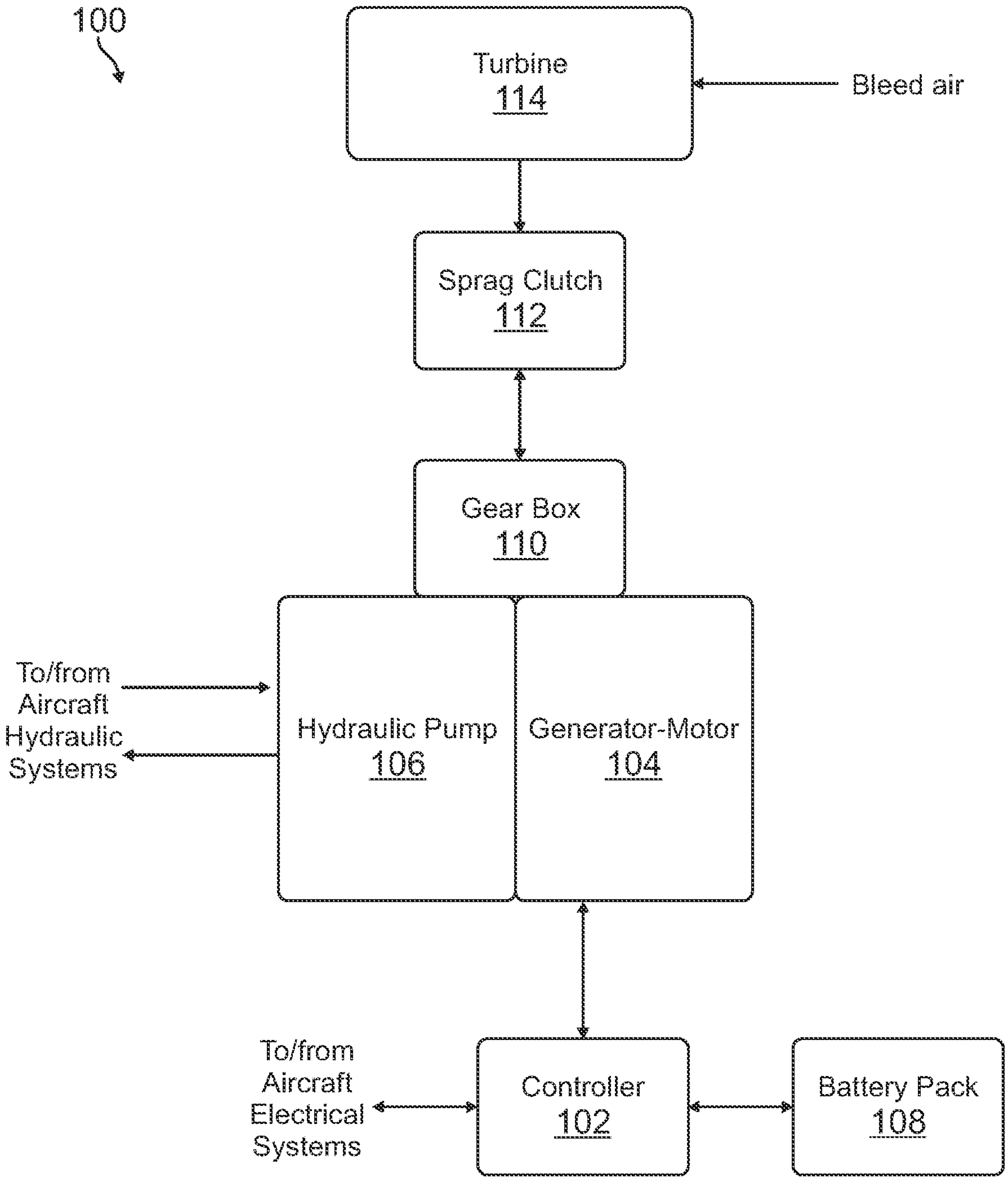
FIG. 1 is a block diagram of a hybrid emergency power unit for an aircraft, according to one embodiment.

FIG. 1 is a block diagram of one embodiment of a hybrid emergency power unit (HEPU) 100 for an aircraft, according to the present approach. The HEPU 100 generally includes a controller 102 operatively coupled with a generator-motor 104, such as a permanent magnet generator-motor. In some embodiments, generator-motor 104 operates at the same speed as the turbine in prior emergency power units (EPUs), e.g., 75,000 rpm. Operating generator-motor 104 at high-speed results in significant weight reduction compared to a conventional generator operating at a baseline speed of 12,000 rpm. This helps reduce the weight of the HEPU compared to prior EPUs.

In addition, HEPU 100 includes a hydraulic pump 106 operatively coupled to generator-motor 104, and a battery pack 108 operatively coupled to controller 102. A gearbox 110 is operatively coupled to generator-motor 104 and hydraulic pump 106. A turbine 114 and generator-motor 104 are configured to supply electricity to controller 102.

In one embodiment, a sprag clutch 112 can be coupled between gearbox 110 and turbine 114. The sprag clutch 112 can be integrated into the design of gearbox 110 to prevent back driving turbine 114 and wasting energy stored in battery pack 108 on turbine windage loss. In addition, in one embodiment, controller 102 and generator-motor 104 can be cooled by hydraulic fluid.

During operation of HEPU 100 in a bleed air mode (BAM), turbine 114 and generator-motor 104 are configured to supply electricity to controller 102. In bleed air mode, the turbine is powered by bleed air from the aircraft engine. Bleed air mode is used when there is a failure or interruption of the aircraft main electrical generator or main hydraulic pump. The controller 102 is configured to rectify the output of generator-motor 104, such as at 400 hertz (Hz) 115 volts alternating current (VAC) or other electrical formats, for consumption by one or more electrical systems onboard the aircraft, such as flight controls and flight critical instruments. In addition, recharging of battery pack 108 can be performed during part of BAM when there is excess power.

During operation of HEPU 100 in an augment mode, when the bleed air is insufficient to provide the required power, controller 102 is configured to start drawing at least some power from battery pack 108 and to convert the output of generator-motor 104, such as at 400 Hz 115 VAC, for consumption by one or more electrical systems onboard the aircraft. The controller 102 is also configured to supply power to generator-motor 104 to aid in driving hydraulic pump 106 in the augment mode.

During operation of HEPU 100 in an emergency mode, which is the monopropellant mode in prior systems, controller 102 is configured to draw electricity from battery pack 108 and provide power to drive generator-motor 104, which in turn drives hydraulic pump 106 thru gearbox 110. The hydraulic pump 106 is configured to provide hydraulic power to the aircraft hydraulic systems to provide the ability to control the aircraft during the emergency. The controller 102 also provides electrical power to the aircraft using power draw from battery pack 108.

The electrical output format will depend on the aircraft platform. The battery energy can replace chemical propellant, which have high handling costs. The battery power can augment bleed air to satisfy short high-power demand from the aircraft. This augmentation results in a smaller turbine with less throttling loss at low power demand.

Figure 2:
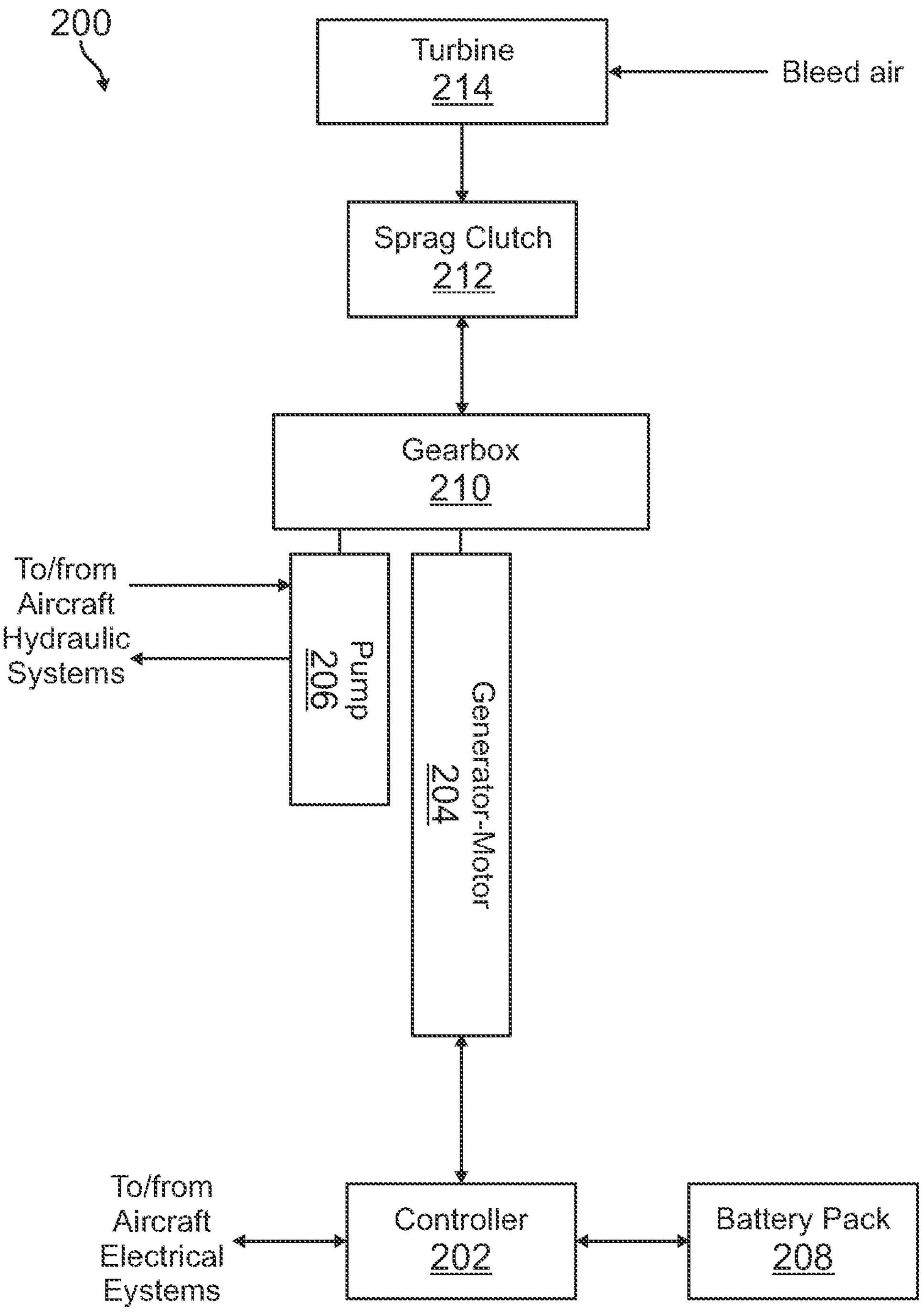
FIG. 2 is block diagram of a hybrid emergency power unit for an aircraft, according to another embodiment.

FIG. 2 is a block diagram of a HEPU 200 for an aircraft, according to another embodiment. The HEPU 200 generally includes a controller 202 operatively coupled with a generator-motor 204, such as a permanent magnet generator-motor. In addition, HEPU 200 includes a hydraulic pump 206 operatively coupled to generator-motor 204, and a battery pack 208 operatively coupled to controller 202. A gearbox 210 is operatively coupled to generator-motor 204 and hydraulic pump 206. A turbine 214 is operatively coupled to generator-motor 204 through gearbox 210. In HEPU 200, generator-motor 204 is configured to be in line with turbine 214, such that generator-motor 204 operates at substantially the same speed as turbine 214.

In one embodiment, a sprag clutch 212 can be coupled between gearbox 210 and turbine 214. The sprag clutch 212 can be integrated into the design of gearbox 210 to prevent back driving turbine 214 and wasting energy stored in battery pack 208 on turbine windage loss.

During operation of HEPU 200 in a bleed air mode (BAM), pneumatic energy in the form of bleed air is fed to turbine 214, and mechanical energy is supplied from turbine 214 to sprag clutch 212 (when present), which in turn supplies the mechanical energy to gearbox 210. The gearbox 210 sends the mechanical energy to generator-motor 204, which converts the mechanical energy to electrical energy that is transmitted to controller 202. The controller 202 rectifies the electrical energy from generator-motor 204, such as at 400 Hz 115 VAC or other electrical formats, for consumption by various aircraft electrical systems. In addition, battery pack 208 can be recharged with electrical energy from controller 202 when there is excess power.

During operation of HEPU 200 in an augment mode, when the bleed air provides insufficient power, controller 202 starts to draw electrical energy from battery pack 208 and converts the electrical energy from generator-motor 204, such as at 400 Hz 115 VAC, for aircraft consumption. The controller 202 can also supply power to generator-motor 204 to help drive hydraulic pump 206, which provides hydraulic flow to and from various aircraft hydraulic systems.

During operation of HEPU 200 in an emergency mode, controller 202 draws electrical energy from battery pack 208 and provides power to drive generator-motor 204, which in turn drives gearbox 210 and hydraulic pump 206. The hydraulic pump 206 provides hydraulic flow to the aircraft hydraulic systems to provide the ability to control the aircraft during the emergency. The controller 202 also provides electrical power to the aircraft using power draw from battery pack 208.

Figure 3:
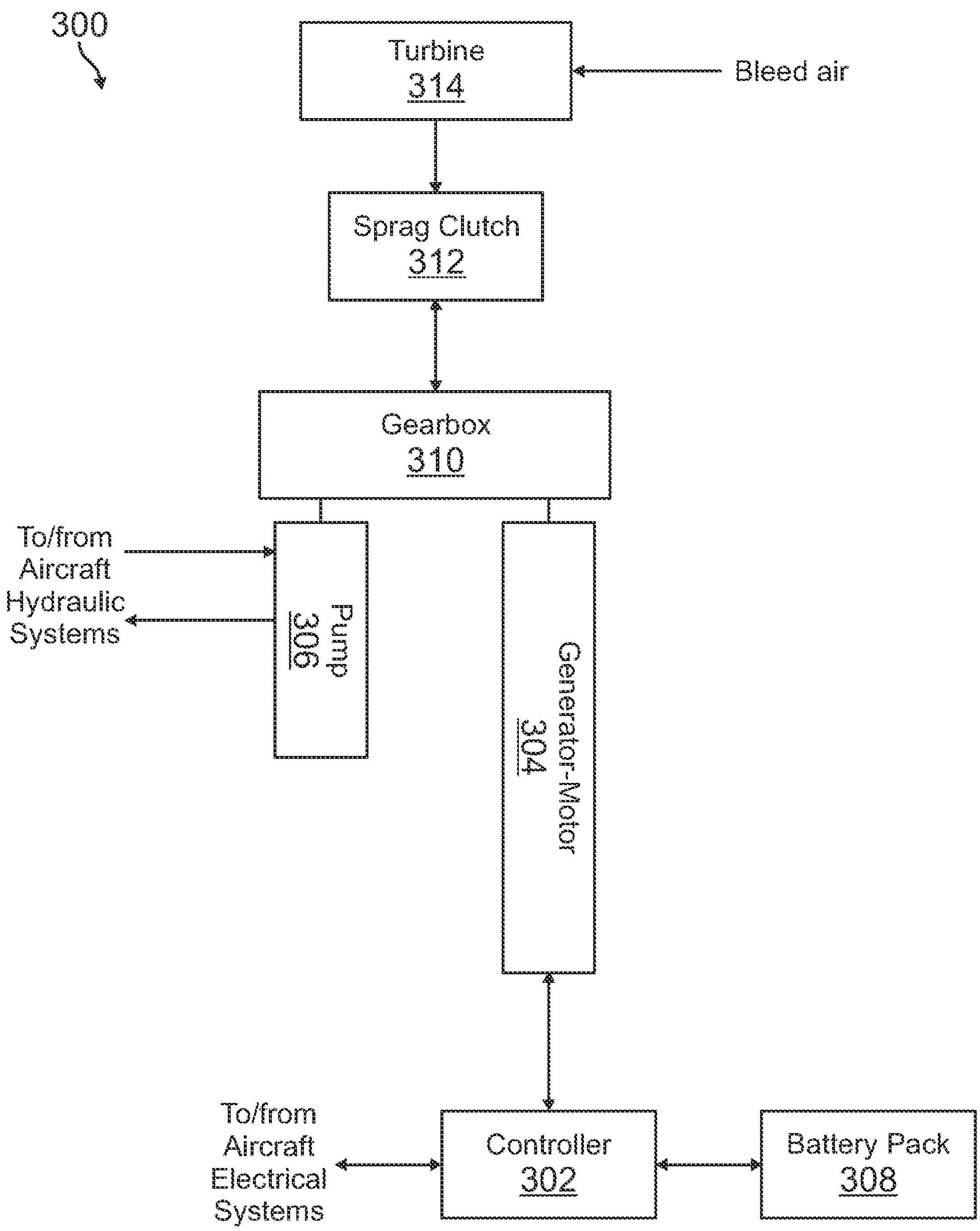
FIG. 3 is block diagram of a hybrid emergency power unit for an aircraft, according to a further embodiment.

FIG. 3 is a block diagram of a HEPU 300 for an aircraft, according to another embodiment. The HEPU 300 generally includes a controller 302 operatively coupled with a generator-motor 304, such as a permanent magnet generator-motor. In addition, HEPU 300 includes a hydraulic pump 306 operatively coupled to generator-motor 304, and a battery pack 308 operatively coupled to controller 302. A gearbox 310 is operatively coupled to generator-motor 304 and hydraulic pump 306. A turbine 314 is operatively connected to generator-motor 304 via gearing in gearbox 310. This allows generator-motor 304 to operate at a higher speed or a lower speed than turbine 314 to optimize performance and weight of turbine 314 and generator-motor 304.

In one embodiment, a sprag clutch 312 can be coupled between gearbox 310 and turbine 314. The sprag clutch 312 can be integrated into the design of gearbox 310 to prevent back driving turbine 314 and wasting energy stored in battery pack 308 on turbine windage loss.

During operation of HEPU 300 in a bleed air mode, pneumatic energy in the form of bleed air is fed to turbine 314, and mechanical energy is supplied from turbine 314 to sprag clutch 312 (when present), which in turn supplies the mechanical energy to gearbox 310. The gearbox 310 sends the mechanical energy via gearing to generator-motor 304, which converts the mechanical energy to electrical energy that is transmitted to controller 302. The controller 302 rectifies the electrical energy from generator-motor 304, such as at 400 Hz 115 VAC or other electrical formats, for consumption by various aircraft electrical systems. In addition, battery pack 308 can be recharged with electrical energy from controller 302 when there is excess power.

During operation of HEPU 300 in an augment mode, when the bleed air is insufficient to provide the required power, controller 302 starts to draw electrical energy from battery pack 308 and converts the electrical energy from generator-motor 304, such as at 400 Hz 115 VAC, for aircraft consumption. The controller 302 can also supply power to generator-motor 304 to help drive hydraulic pump 306, which provides hydraulic flow to and from various aircraft hydraulic systems.

During operation of HEPU 300 in an emergency mode, controller 302 draws electrical energy from battery pack 308 and provides power to drive generator-motor 304, which in turn drives gearbox 310 and hydraulic pump 306. The hydraulic pump 306 provides hydraulic flow to the aircraft hydraulic systems to provide the ability to control the aircraft during the emergency. The controller 302 also provides electrical power to the aircraft using power draw from battery pack 308.

Example Embodiments

Example 1 includes a hybrid emergency power unit for an aircraft, comprising: a controller; a generator-motor operatively coupled to the controller; a hydraulic pump operatively coupled to the generator-motor; a battery pack operatively coupled to the controller; and a turbine operatively coupled to the generator-motor; wherein during a bleed air mode, the turbine and the generator-motor are configured to supply electricity to the controller, which is configured to rectify an output of the generator-motor for consumption by one or more electrical systems on the aircraft; wherein during an augment mode, when bleed air provides insufficient power, the controller is configured to draw at least some power from the battery pack and convert the output of the generator-motor for consumption by the one or more electrical systems on the aircraft; wherein during an emergency mode, the controller is configured to draw electricity from the battery pack and provide power to drive the generator-motor, which in turn drives the hydraulic pump and provides electrical power to aircraft systems.

Example 2 includes the hybrid emergency power unit of Example 1, wherein the generator-motor comprises a permanent magnet generator-motor.

Example 3 includes the hybrid emergency power unit of any of Examples 1-2, wherein the generator-motor is configured to be in line with the turbine, such that the generator-motor operates at substantially a same speed as the turbine.

Example 4 includes the hybrid emergency power unit of any of Examples 1-3, further comprising a gearbox operatively coupled to the generator-motor and the hydraulic pump.

Example 5 includes the hybrid emergency power unit of Example 4, wherein the turbine is operatively coupled to the generator-motor via gearing in the gearbox, allowing the generator-motor to operate at a higher speed or a lower speed than the turbine.

Example 6 includes the hybrid emergency power unit of any of Examples 4-5, further comprising a sprag clutch coupled between the gearbox and the turbine.

Example 7 includes the hybrid emergency power unit of any of Examples 1-6, wherein during the bleed air mode, the controller is configured to rectify the output of the generator-motor at 400 hertz (Hz) 115 volts alternating current (VAC).

Example 8 includes the hybrid emergency power unit of any of Examples 1-7, wherein during the bleed air mode, the controller is configured to recharge the battery pack when there is excess power from the generator-motor.

Example 9 includes the hybrid emergency power unit of any of Examples 1-8, wherein during the augment mode, the controller is configured to convert electrical energy from the generator-motor at 400 Hz 115 VAC.

Example 10 includes the hybrid emergency power unit of any of Examples 1-9, wherein during the augment mode, the controller is configured to supply power to the generator-motor to aid in driving the hydraulic pump, which is configured to provide hydraulic flow to one or more hydraulic systems onboard the aircraft.

Example 11 includes the hybrid emergency power unit of any of Examples 1-10, wherein during the emergency mode, the hydraulic pump is configured to provide hydraulic flow to one or more hydraulic systems onboard the aircraft.

Example 12 includes a hybrid emergency power unit for an aircraft, comprising: a controller; a generator-motor operatively coupled to the controller; a hydraulic pump operatively coupled to the generator-motor; a battery pack operatively coupled to the controller; a turbine operatively coupled to the generator-motor; and a gearbox operatively coupled to the generator-motor and the hydraulic pump; wherein the generator-motor is configured to be in line with the turbine, such that the generator-motor operates at substantially a same speed as the turbine; wherein during a bleed air mode, the turbine and the generator-motor are configured to supply electricity to the controller, which is configured to rectify an output of the generator-motor for consumption by one or more electrical systems on the aircraft; wherein during an augment mode, when bleed air provides insufficient power, the controller is configured to draw at least some power from the battery pack and convert the output of the generator-motor for consumption by the one or more electrical systems on the aircraft; wherein during an emergency mode, the controller is configured to draw electricity from the battery pack and provide power to drive the generator-motor, which in turn drives the hydraulic pump and provides electrical power to aircraft systems.

Example 13 includes the hybrid emergency power unit of Example 12, wherein the generator-motor comprises a permanent magnet generator-motor.

Example 14 includes the hybrid emergency power unit of any of Examples 12-13, further comprising a sprag clutch coupled between the gearbox and the turbine.

Example 15 includes the hybrid emergency power unit of any of Examples 12-14, wherein during the bleed air mode, the controller is configured to rectify the output of the generator-motor at 400 Hz 115 VAC.

Example 16 includes the hybrid emergency power unit of any of Examples 12-15, wherein during the bleed air mode, the controller is configured to recharge the battery pack when there is excess power from the generator-motor.

Example 17 includes the hybrid emergency power unit of any of Examples 12-16, wherein during the augment mode, the controller is configured to convert electrical energy from the generator-motor at 400 Hz 115 VAC.

Example 18 includes the hybrid emergency power unit of any of Examples 12-17, wherein during the augment mode, the controller is configured to supply power to the generator-motor to aid in driving the hydraulic pump, which is configured to provide hydraulic flow to one or more hydraulic systems onboard the aircraft.

Example 19 includes the hybrid emergency power unit of any of Examples 12-18, wherein during the emergency mode, the hydraulic pump is configured to provide hydraulic flow to one or more hydraulic systems onboard the aircraft.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A hybrid emergency power unit for an aircraft, comprising:

a controller;

a generator-motor operatively coupled to the controller;

a single hydraulic pump operatively coupled to the generator-motor;

a battery pack operatively coupled to the controller; and a turbine operatively coupled to the generator-motor;

wherein during a bleed air mode, the turbine and the generator-motor are configured to supply electricity to the controller, which is configured to rectify an output of the generator-motor for consumption by one or more electrical systems on the aircraft;

wherein during an augment mode, when bleed air provides insufficient power, the controller is configured to draw at least some power from the battery pack and convert the output of the generator-motor for consumption by the one or more electrical systems on the aircraft;

wherein during an emergency mode, the controller is configured to draw electricity from the battery pack and provide power to drive the generator-motor, which in turn drives the hydraulic pump and provides electrical power to aircraft systems.

2. The hybrid emergency power unit of claim 1, wherein the generator-motor comprises a permanent magnet generator-motor.

3. The hybrid emergency power unit of claim 1, wherein the generator-motor is configured to be in line with the turbine, such that the generator-motor operates at substantially a same speed as the turbine.

4. The hybrid emergency power unit of claim 1, further comprising a gearbox operatively coupled to the generator-motor and the hydraulic pump.

5. The hybrid emergency power unit of claim 4, wherein the turbine is operatively coupled to the generator-motor via gearing in the gearbox, allowing the generator-motor to operate at a higher speed or a lower speed than the turbine.

6. The hybrid emergency power unit of claim 4, further comprising a sprag clutch coupled between the gearbox and the turbine.

7. The hybrid emergency power unit of claim 1, wherein during the bleed air mode, the controller is configured to rectify the output of the generator-motor at 400 hertz (Hz) 115 volts alternating current (VAC).

8. The hybrid emergency power unit of claim 1, wherein during the bleed air mode, the controller is configured to recharge the battery pack when there is excess power from the generator-motor.

9. The hybrid emergency power unit of claim 1, wherein during the augment mode, the controller is configured to convert electrical energy from the generator-motor at 400 Hz 115 VAC.

10. The hybrid emergency power unit of claim 1, wherein during the augment mode, the controller is configured to supply power to the generator-motor to aid in driving the hydraulic pump, which is configured to provide hydraulic flow to one or more hydraulic systems onboard the aircraft.

11. The hybrid emergency power unit of claim 1, wherein during the emergency mode, the hydraulic pump is configured to provide hydraulic flow to one or more hydraulic systems onboard the aircraft.

12. A hybrid emergency power unit for an aircraft, comprising:

a controller;

a generator-motor operatively coupled to the controller;

a single hydraulic pump operatively coupled to the generator-motor;

a battery pack operatively coupled to the controller;

a turbine operatively coupled to the generator-motor; and a gearbox operatively coupled to the generator-motor and the hydraulic pump;

wherein the generator-motor is configured to be in line with the turbine, such that the generator-motor operates at substantially a same speed as the turbine;

wherein during a bleed air mode, the turbine and the generator-motor are configured to supply electricity to the controller, which is configured to rectify an output of the generator-motor for consumption by one or more electrical systems on the aircraft;

wherein during an augment mode, when bleed air provides insufficient power, the controller is configured to draw at least some power from the battery pack and convert the output of the generator-motor for consumption by the one or more electrical systems on the aircraft;

wherein during an emergency mode, the controller is configured to draw electricity from the battery pack and provide power to drive the generator-motor, which in turn drives the hydraulic pump and provides electrical power to aircraft systems.

13. The hybrid emergency power unit of claim 12, wherein the generator-motor comprises a permanent magnet generator-motor.

14. The hybrid emergency power unit of claim 12, further comprising a sprag clutch coupled between the gearbox and the turbine.

15. The hybrid emergency power unit of claim 12, wherein during the bleed air mode, the controller is configured to rectify the output of the generator-motor at 400 Hz 115 VAC.

16. The hybrid emergency power unit of claim 12, wherein during the bleed air mode, the controller is configured to recharge the battery pack when there is excess power from the generator-motor.

17. The hybrid emergency power unit of claim 12, wherein during the augment mode, the controller is configured to convert electrical energy from the generator-motor at 400 Hz 115 VAC.

18. The hybrid emergency power unit of claim 12, wherein during the augment mode, the controller is configured to supply power to the generator-motor to aid in driving the hydraulic pump, which is configured to provide hydraulic flow to one or more hydraulic systems onboard the aircraft.

19. The hybrid emergency power unit of claim 12, wherein during the emergency mode, the hydraulic pump is configured to provide hydraulic flow to one or more hydraulic systems onboard the aircraft.

* * * * *